(12) United States Patent
Shreiner

(10) Patent No.: US 10,134,171 B2
(45) Date of Patent: Nov. 20, 2018

(54) GRAPHICS PROCESSING SYSTEMS

(71) Applicant: Arm Ltd., Cambridge (GB)

(72) Inventor: David Robert Shreiner, San Jose, CA (US)

(73) Assignee: Arm Limited, Cambridge (GB)

( * ) Notice: Subject to any disclaimer, the term of this patent is extended or adjusted under 35 U.S.C. 154(b) by 147 days.

(21) Appl. No.: 14/501,005

(22) Filed: Sep. 29, 2014

(65) Prior Publication Data

US 2016/0093088 A1    Mar. 31, 2016

(51) Int. Cl.
*G06T 15/00* (2011.01)
*G06T 1/20* (2006.01)
*G06T 17/20* (2006.01)
*G06F 15/16* (2006.01)

(52) U.S. Cl.
CPC .............. *G06T 15/005* (2013.01); *G06T 1/20* (2013.01); *G06T 17/20* (2013.01); *G06F 15/16* (2013.01)

(58) Field of Classification Search
None
See application file for complete search history.

(56) References Cited

U.S. PATENT DOCUMENTS

| 2009/0295798 | A1 | 12/2009 | Goel | |
|---|---|---|---|---|
| 2010/0164954 | A1* | 7/2010 | Sathe | G06T 17/20 345/423 |
| 2010/0164955 | A1* | 7/2010 | Sathe | G06T 17/20 345/423 |
| 2011/0057931 | A1* | 3/2011 | Goel | G06T 17/20 345/423 |
| 2014/0063013 | A1* | 3/2014 | Goel | G06T 17/20 345/423 |

FOREIGN PATENT DOCUMENTS

EP        0889440        1/1999

OTHER PUBLICATIONS

GB Combined Search and Examination Report dated Feb. 11, 2016, GB Patent Application No. GB1517109.3.

* cited by examiner

*Primary Examiner* — Barry Drennan
*Assistant Examiner* — Schiller Hill
(74) *Attorney, Agent, or Firm* — Vierra Magen Marcus LLP

(57) ABSTRACT

A graphics processing pipeline comprises a tessellation stage 10 operable to tessellate a patch representing some or all of an object to be rendered, so as to generate positions for a set of vertices for one or more output primitives, and a primitive assembly stage 20 operable to assemble one or more output primitives for processing using the positions for a set of vertices generated by the tessellation stage and pre-defined information defining the connectivity between at least some of the vertices of the set of vertices.

20 Claims, 7 Drawing Sheets

(a) level = 3  (b) level = 5  (c) level = 7

GRAPHICS PROCESSING SYSTEMS

BACKGROUND

The technology described herein relates to the processing of graphics, e.g., for display on a display screen.

As is known in the art, it is common in graphics systems to render objects for display by sub-dividing the surface of each object into a number of similar basic components (so-called "primitives") to allow the graphics processing operations to be more easily carried out. These "primitives" are usually in the form of simple polygons, such as triangles and quadrilaterals.

The graphics primitives are usually generated by the applications program interface for the graphics processing system, using the graphics drawing instructions (requests) received from the application (e.g. game) that requires the graphics output.

Each primitive at this stage is usually defined by and represented as a set of vertices. Each vertex for a primitive has associated with it a set of data (such as position, colour, texture and other attributes data) indicating the properties of the primitive at the vertex. This data is then used, for example, when rasterising and rendering the primitives in order to generate the desired output of the graphics processing system.

Once primitives and their vertices have been generated and defined, they can be processed by the graphics processing system, in order, for example, to display the object that they relate to.

One way to display the surface of an object more accurately and therefore realistically is to increase the number of primitives and vertices used to represent the object. However, sometimes this additional information may not be needed, for example if the object is being viewed from far away or its surface is at a shallow angle to the viewer, such that finer detail in the surface geometry will not be visible in the rendered output, even if it is generated (rendered). In such circumstances, it is a waste of processing resources to process a large number of primitives representing the finer detail of the object.

It is known therefore to represent the surface geometry of objects with larger "patches", and to then tessellate additional primitives within a patch in the graphics processing pipeline, if required, in order to display a finer level of detail of the object. (As is known in the art, a "patch" is a graphical entity that represents some or all of an object to be displayed (rendered)). This process is known as "tessellation", and is present in, for example, modern versions of OpenGL and Direct3D.

There are three common types of tessellation: triangular, quadrilateral and isoline. As will be explained more fully below, the technology described herein is particularly concerned with triangular tessellation, which is often the most complex of the three.

FIG. 1 depicts a tessellation stage 10 as implemented in OpenGL and Direct3D, which includes two shader stages 11, 13 and a fixed-function primitive generator or tessellator 12. The hull shader (using Direct3D terminology) or control shader (using OpenGL terminology) 11 is operable to receive a patch (e.g. from upstream stages of the graphics processing pipeline), and to, inter alia, calculate a set of "tessellation levels". (As is known in the art, the control shader 11 may also modify the patch in some way.) The tessellation levels define the level of tessellation required, and thus the number of additional output primitives that will be generated by the tessellation process.

The tessellation levels are passed to the primitive generator 12, which operates to tessellate a domain to the required degree. As is known in the art, the primitive generator 12 operates on an abstract representation or domain (i.e. not on the patch) (the tessellated domain is then mapped to the patch).

In the case of triangular tessellation, a triangular domain is tessellated into a plurality of triangular tessellation primitives. FIG. 2 shows an example of a triangular domain that has been tessellated. In this case, the primitive generator 12 operates to divide up the triangular domain into smaller triangular tessellation primitives, where the number of tessellation primitives depends on the tessellation levels.

The tessellation levels for a triangular domain comprise an inner tessellation level, $IL_0$, which effectively defines the number of tessellation primitives required for the inner part of the triangular domain, and three perimeter tessellation levels, $OL_0$, $OL_1$, $OL_2$, i.e. one for each edge of the triangular domain, which (together with the inner tessellation level) effectively define the number of tessellation primitives required for the outer part of the triangular domain. These are depicted in FIG. 3. (As used herein, "outer" tessellation primitives are those tessellation primitives that have a vertex on the perimeter of the tessellation domain, and "inner" tessellation primitives are those tessellation primitives that do not have any vertices on the perimeter of the domain. Similarly, "outer" output primitives are those output primitives that correspond to (are derived from) the outer tessellation primitives, and "inner" output primitives are those output primitives that correspond to (are derived from) the inner tessellation primitives.)

The set of tessellated primitives is defined by a set of tessellation coordinates (i.e. points within the triangular domain at the corners of the tessellation primitives), and information defining the connectivity between the tessellation coordinates (i.e. how the tessellation coordinates are to be "joined up" to produce the set of tessellated primitives). This information is calculated by the primitive generator 12.

The domain shader (using Direct3D terminology) or evaluation shader (using OpenGL terminology) 13 receives the output patch from the control shader 11 as well as the tessellation coordinates from the primitive generator 12, and then operates to map the tessellation coordinates onto the patch, i.e. so as to calculate positions of vertices for the output primitives (that are being tessellated) within the patch.

A downstream primitive assembly stage 20 assembles the output primitives using the calculated positions from the domain or evaluation shader 13 and the connectivity information from the primitive generator 12, and then passes the assembled output primitives to further downstream stages of the graphics processing pipeline for further processing, such as rasterisation and rendering, etc., in the usual manner.

In graphics processors, e.g. in lower power and portable devices, it is generally desirable to try to reduce the amount of processing required to generate, e.g. an image for display, so as to reduce the power consumption of the device.

The Applicants believe that there remains scope for improvements to techniques for processing graphics data, and in particular to arrangements where tessellation is provided and used.

BRIEF DESCRIPTION OF THE DRAWINGS

Various embodiments of the technology described herein will now be described by way of example only and with reference to the accompanying drawings, in which.

DETAILED DESCRIPTION

Figure 1:
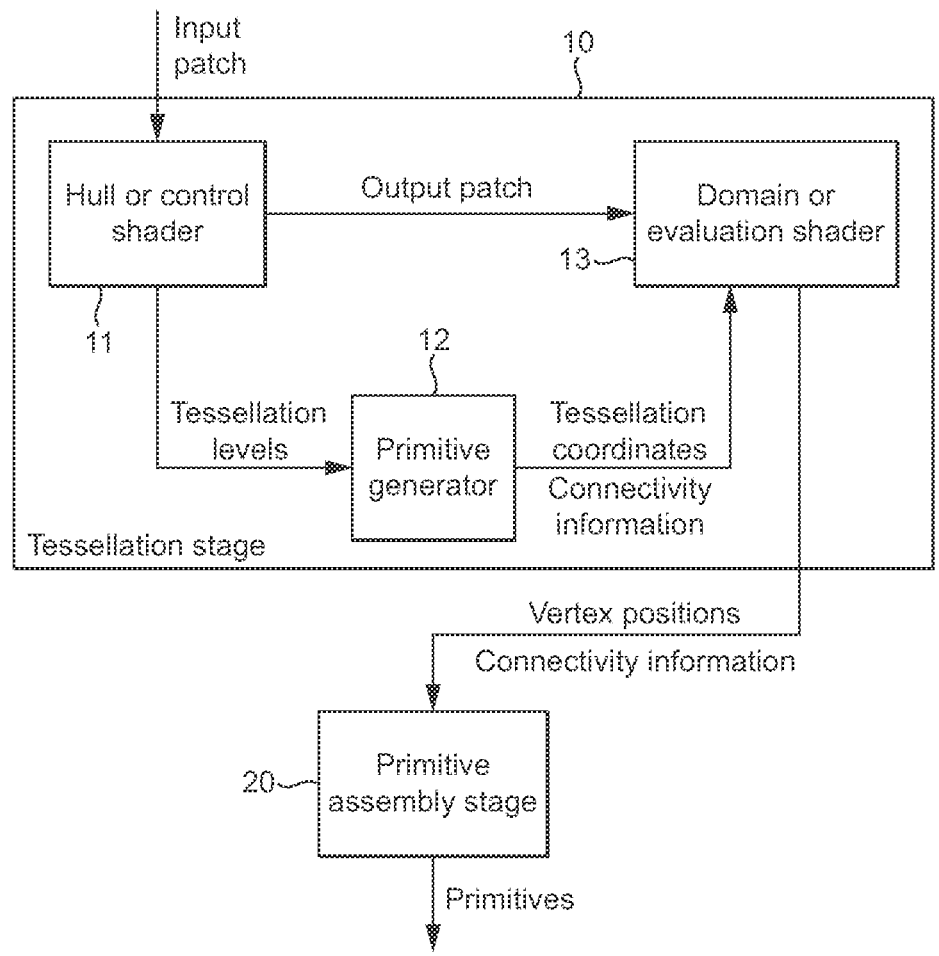
FIG. 1 shows schematically a portion of a conventional graphics processing pipeline comprising a tessellation stage and a primitive assembly stage.

A first embodiment of the technology described herein comprises a method of operating a graphics processing pipeline that comprises a tessellation stage and a primitive assembly stage, the method comprising:

the tessellation stage tessellating a patch representing some or all of an object to be rendered, so as to generate positions for a set of vertices for one or more output primitives; and the primitive assembly stage assembling one or more output primitives for processing using the positions for the set of vertices generated by the tessellation stage and pre-defined information defining the connectivity between at least some of the vertices of the set of vertices.

A second embodiment of the technology described herein comprises a graphics processing pipeline comprising:

a tessellation stage operable to tessellate a patch representing some or all of an object to be rendered, so as to generate positions for a set of vertices for one or more output primitives; and a primitive assembly stage operable to assemble one or more output primitives using the positions for a set of vertices generated by the tessellation stage and pre-defined information defining the connectivity between at least some of the vertices of the set of vertices.

The technology described herein relates to the tessellation operation of a graphics processing pipeline. Like in conventional tessellation arrangements, a patch representing all or part of an object to be rendered is tessellated to generate the positions for vertices for one or more output primitives, and a primitive assembly stage downstream of the tessellation stage uses the positions when assembling the one or more output primitives.

However, unlike in conventional arrangements, pre-defined information defining the connectivity between at least some of the vertices of the set of vertices is used when assembling the one or more output primitives.

This then means that, in contrast with conventional arrangements, the tessellation stage of the graphics processing pipeline need not (and in an embodiment does not) calculate information defining the connectivity between at least some of the vertices (when performing its tessellation operation). Accordingly, the amount of processing that the tessellation stage is required to perform for each tessellation operation can be significantly reduced (the Applicants estimate that current tessellation algorithms spend up to 40% of their time calculating connectivity information), and the overall power consumption of a graphics processing system that uses tessellation can be reduced.

As discussed above, in tessellation arrangements, the number of inner primitives produced by the primitive generation stage is controlled by the inner tessellation level. The Applicants have recognised that as the inner tessellation level increases (and more primitives are produced), connectivity information is shared between the different tessellation levels.

For example, for an inner tessellation level of 3, the triangular domain is tessellated so as to produce a single triangular primitive in the centre of the domain. For an inner tessellation level of 5, a corresponding triangular primitive is produced at the centre of the domain, and a set of further primitives are produced which effectively "wrap around", i.e. surround and enclose, the central primitive. The coordinates of the vertices of the central primitive are different in each case, but the connectivity information for the central primitive (i.e. how the coordinates are connected together so as to form the primitive) is the same.

Similarly, for an inner tessellation level of 7, a corresponding central triangular primitive and first set of primitives that "wrap around" the central primitive are produced, together with another set of primitives that wrap around the first set of primitives. Again, the coordinates for the central primitive and the first set of primitives are different between the different tessellation levels, but the connectivity information for the central primitive and the first set of primitives is the same between the different tessellation levels.

Figure 7:
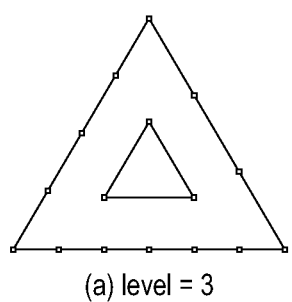
FIG. 7 shows a tessellated triangular domains for successive odd inner tessellation levels of $IL_0=3$, 5 and 7, where only the connectivity information for the inner primitives is shown.
Figure 7:
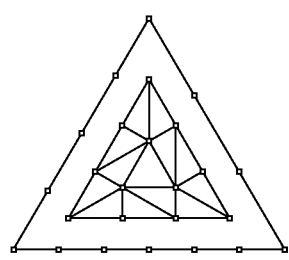
Figure 7:
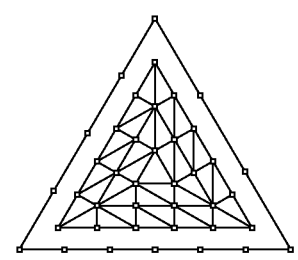

FIG. 7 illustrates this and shows a tessellated triangular domains for successive odd inner tessellation levels of $IL_0=3$, 5 and 7, where only the connectivity information for the inner primitives is shown.

Moreover, the Applicants have found that this property holds for all higher odd inner tessellation levels, and that a similar pattern can be found for the even inner tessellation levels.

Thus, the Applicants have recognised that connectivity information is shared between the different tessellation levels, and, furthermore, that this then means that a common set of connectivity information can be used for plural tessellation levels. Furthermore, as will be discussed below, that pre-defined connectivity information can be provided in a particularly convenient and compact form. This then means that it is effective to predefine the connectivity information, thereby (significantly) reducing the amount of processing required to be done by the tessellation stage, but without requiring a significant amount of information to be stored in memory.

(It will be appreciated that, in contrast with the connectivity information, the tessellation coordinates are different for every different tessellation level, and that the coordinates are not shared between the different tessellation levels. Thus, while it would be possible to use pre-defined information for the tessellation coordinates of each tessellation level (and in one embodiment this is done), the amount of information that would then be required to be stored may be very large. Thus, the benefits derived by reducing the amount of processing required for each tessellation operation would be outweighed by the large amount of information that would need to be stored.)

The tessellation stage should be (and in an embodiment is) operable to tessellate a patch or patches representing some or all of an object or objects to be rendered, so as to generate positions for a set of vertices for one or more output primitives.

As is known in the art, a patch is a graphical entity that represents some or all of an object, e.g. some or all of the surface of an object, to be rendered. (Thus an object may be represented by a single patch or by plural patches.) The patch may be (and in an embodiment is) a surface, such as a Bézier surface, defined by a plurality of control points. The patch is in an embodiment generated by the application program interface for the graphics processing system, e.g. using graphics drawing instructions (requests) received from the application (e.g. game) that requires the graphics output, and passed to the tessellation stage for tessellation.

The tessellation stage of the technology described herein may comprise any suitable such stage that is operable to tessellate a patch to generate positions for a set of vertices for one or more output primitives. As is known in the art, the tessellation stage in an embodiment generates the positions of the set of vertices for the one or more output primitives by generating a set of tessellation coordinates that are then mapped to the patch in question to give the actual positions to be used for the vertices. The output of the tessellation stage is in an embodiment an array of vertices that will then be used by the primitive assembly stage to produce the primitives for processing by the rest of the graphics processing pipeline.

In an embodiment, the vertices in the vertex array that is output by the tessellation stage are arranged in the array in a particular, in an embodiment selected, in an embodiment predefined order (are indexed in the array in a particular, in an embodiment selected, in an embodiment predefined order). In an embodiment, the vertices in the array are arranged in an order starting with the vertices for the inner primitives, followed by the vertices for the respective outer perimeter (edge) primitives. In an embodiment the order is such that the vertices for the inner primitives are followed by the vertices for the (three) exterior edge(s) of the inner primitives, which are then followed by the perimeter edge vertices for the outer primitives. As will be discussed further below, the vertices for the inner primitives are in an embodiment also ordered in a selected, in an embodiment predefined, order in the vertex array.

The operation of the tessellation stage of the technology described herein in an embodiment corresponds to the operation of conventional tessellation stages, with the exception that the tessellation stage need not (and in an embodiment does not) calculate all of the information defining the connectivity between the set of vertices (which is to be used to assemble the primitives). In one embodiment, the tessellation stage is operable to calculate only a part of (some, but not all, of) the information defining the connectivity between the set of vertices. In another embodiment, the tessellation stage does not calculate any of the information defining the connectivity between the set of vertices.

As will be appreciated, this then means that the amount of processing that is required to be performed by the tessellation stage for each tessellation operation can be significantly reduced when compared with conventional arrangements.

The tessellation stage may be operable to carry out any desired type of tessellation, such as triangular, quadrilateral or isoline tessellation. However, it is in an embodiment operable to carry out triangular tessellation (it operates in the triangular domain).

The tessellation stage is in an embodiment operable to carry out a number of operations as part of the tessellation operation. These may be implemented as separate and distinct processing operations. However, in an embodiment, at least some of the operations are "merged" together into a single processing operation, e.g. into a single shading operation. In one such embodiment, all three operations of the tessellation stage described below are "merged" together, e.g. as a single shading operation.

A first operation in an embodiment receives the patch, and calculates a set of tessellation levels. In one embodiment, the patch may also be modified in some way by the first operation. In an embodiment, the first operation is carried out by a hull or control shader.

The tessellation levels in an embodiment define the level of tessellation required, and thus the number of additional primitives that will be generated by the tessellation process. The manner in which the tessellation levels are calculated is in an embodiment defined by the configuration of the first operation (hull or control shader), and may depend, for example, on the position of the camera (view point) in the scene to be displayed.

As discussed above, the tessellation levels for a triangular domain comprise an inner tessellation level, which effectively defines the number of primitives required for the inner part of the triangular domain, and three perimeter tessellation levels, i.e. one for each edge of the triangular domain, which (together with the inner tessellation level) effectively define the number of primitives required for the outer part of the triangular domain. Thus, in an embodiment, the first operation generates an inner tessellation level, and three perimeter tessellation levels.

A second operation in an embodiment receives the tessellation levels and tessellates (divides up) a tessellation domain (e.g. into a plurality of tessellation primitives) to the required degree (i.e. depending on the values of the tessellation levels). The second operation in an embodiment generates (calculates) a plurality of tessellation coordinates that will be used to define positions for the vertices for the one or more tessellation primitives that the domain is divided into. In an embodiment, the second operation is carried out by a primitive generation stage.

In the case of triangular tessellation, the second operation in an embodiment operates on a triangular domain, i.e. to tessellate the triangular domain, so as to produce a plurality of tessellation coordinates that define one or more triangular tessellation primitives.

As discussed above, the tessellation primitives into which the domain is divided need both a set of tessellation coordinates and information defining the connectivity between the tessellation coordinates (i.e. information defining how to "join up" the tessellation coordinates to produce the set of tessellated primitives). (The information defining the connectivity between the tessellation coordinates is equivalent to (and is) the information that defines the connectivity between the set of vertices.)

In conventional systems, as discussed above, the primitive generator also determines and generates the connectivity information.

However, in the technology described herein, the second operation (primitive generation stage) need not and in an embodiment does not calculate all of the information that defines the connectivity between the tessellation coordinates (vertices) (as pre-defined information is used instead when that information is needed, as discussed above). Thus the tessellation stage does not calculate all the information defining the connectivity between the set of vertices that is needed.

In an embodiment, the second operation calculates only a part of (some, but not all, of) the information defining the connectivity between the tessellation coordinates (and thus, the tessellation stage is operable to calculate only a part of (some, but not all, of) the information defining the connectivity between the set of vertices). In another embodiment, the second operation does not calculate any of the information defining the connectivity between the tessellation coordinates (and thus the tessellation stage does not calculate any of the information defining the connectivity between the set of vertices).

As will be appreciated, this then means that the amount of processing that is required to be performed for the second operation (by the tessellation stage) during each tessellation operation can be significantly reduced when compared with conventional arrangements.

In embodiments where the tessellation stage (the second operation) calculates only a part of (some, but not all, of) the information defining the connectivity between the tessellation coordinates, the tessellation stage (e.g. second operation) may calculate any of the connectivity information (and not calculate the remaining connectivity information), as desired. However, in an embodiment, the tessellation stage (e.g. second operation) in an embodiment calculates the connectivity information for the "outer" tessellation primitives. In this embodiment, the tessellation stage (e.g. second operation) in an embodiment does not calculate the connectivity information for the "inner" tessellation primitives (and pre-defined connectivity information is used for the inner primitives when that information is needed, as will be discussed further below).

Accordingly, in these embodiments (where the tessellation stage is operable to calculate only a part of (some, but not all, of) the information defining the connectivity between the set of vertices), the tessellation stage in an embodiment calculates the connectivity information for the "outer" primitives. In an embodiment the tessellation stage does not calculate the connectivity information for the "inner" primitives (and pre-defined connectivity information is used for the inner primitives when that information is needed, as will be discussed further below).

Thus, in an embodiment, the tessellation stage calculates information defining the connectivity between the vertices of the outer primitives of the set of output primitives, but does not calculate information defining the connectivity between the vertices of the inner primitives of the one or more output primitives.

A third operation of the tessellation stage in an embodiment receives the patch output from the first operation, along with the tessellation coordinates from the second operation, and maps the tessellation coordinates onto the patch, in an embodiment so as to calculate the positions of the set of vertices (i.e. to calculate the positions of the vertices for the one or more primitives into which the patch is being tessellated). In an embodiment, the third operation is carried out by a domain or evaluation shader.

The primitive assembly stage should be (and in an embodiment is) operable to assemble the one or more output primitives for processing, e.g. by one or more processing stages of the graphics processing pipeline downstream of the primitive assembly stage. The primitive assembly stage may be any suitable such stage that assembles primitives using the positions of vertices and information defining the connectivity between the vertices.

The primitive assembly stage is in an embodiment operable to use the set of positions for the set of vertices from the tessellation stage.

In contrast with standard primitive assembly stages, however, the primitive assembly stage of the graphics processing pipeline of the technology described herein is in an embodiment operable to use, for some or all of the connectivity information, pre-defined connectivity information.

The pre-defined connectivity information should define (indicate) how the vertices that it relates to (thus, e.g., the vertices of the inner primitives) should be connected together to form the primitives in question (i.e. it will indicate and define the topology of the primitives in question), and should be predefined, i.e. generated in advance (before the processing of the patch in question by the tessellation stage and/or GPU begins). Thus the pre-defined connectivity information will exist before the patch in question is passed to the tessellation stage and is connectivity information that has not been generated by the tessellation stage.

Thus the primitive assembly stage will use at least some connectivity information (namely the pre-defined connectivity information) that has not been generated by the tessellation stage, when assembling the output primitives.

The pre-defined connectivity information can be generated as desired. It is in an embodiment generated by executing an appropriate routine or algorithm (processing steps) that generates that information For example, it could be generated "offline" using an appropriate processor, and then stored in a manner such that it can then be used by the graphics processing pipeline as necessary (and in an embodiment, this is what is done). Any processing device capable of generating the connectivity information and storing it to memory could be used for this, such as a CPU, GPU, DSP, etc.

It would also be possible for the overall system that the graphics processing pipeline is part of to generate the pre-defined connectivity information that the primitive assembly stage uses "in use", i.e. as and when it is identified that such information will be required by (the primitive assembly stage of) the graphics processing pipeline. (In this case the pre-defined connectivity information will still need to be and will still be generated in advance of the processing by the tessellation stage of any patch that requires the connectivity information, it is just that the connectivity information may not previously have been generated "offline".)

In this case, in an embodiment the driver for the graphics processing pipeline that is executing on the host processor identifies the need to generate the pre-defined connectivity information and triggers the generation and storage of that information for use by the graphics processing pipeline, before the patch or patches in question are passed to the graphics processing pipeline for processing. This may be appropriate where, for example, it is desired to generate the pre-defined connectivity information for the tessellation level required at the time it is needed, rather than maintaining a set of connectivity information e.g. for the maximum tessellation level that the graphics processing pipeline in question can support.

Where the predefined connectivity information is generated at the time it is identified as being needed, the so-generated pre-defined connectivity information could be, and in an embodiment is, stored once it has been generated, e.g. for future use. In this case therefore, there may be a first tessellation operation for a patch or patches where the pre-defined connectivity information is generated, but thereafter the primitive assembly stage would use and look up previously stored pre-defined connectivity information.

It will be appreciated in this regard, that irrespective of whether the pre-defined connectivity information is generated "offline", or "in use", in either case, that pre-defined connectivity information will be generated and stored such that it can then be read by the primitive assembly stage when it requires it in advance of the patch being processed by the tessellation stage and the primitive assembly stage. The primitive assembly stage will then look up the stored pre-defined connectivity information when it requires it. Thus, in an embodiment, the primitive assembly stage will look up the pre-defined connectivity information (e.g. from a look-up table or similar) when it is required. The pre-defined connectivity information may be pre-calculated and stored in memory, or it may be encoded in hardware.

In embodiments where the tessellation stage is operable to calculate only a part of (some, but not all, of) the information defining the connectivity between the set of vertices, the primitive assembly stage should also be (and in an embodiment is) operable to use the calculated connectivity information, e.g. from the tessellation stage (and to use that information, together with the (looked-up) pre-defined connectivity information, to assemble the one or more output primitives).

Thus, in an embodiment, the primitive assembly stage uses pre-defined connectivity information to assemble some primitives of the set of output primitives, and uses connectivity information generated by the tessellation stage to assemble other output primitives.

The pre-defined connectivity (topology) information may define the connectivity between any or all of the set of vertices. The pre-defined connectivity information may define the connectivity between the vertices of both the inner and outer primitives, but in an embodiment the information is in respect of the inner primitives only (and the remaining connectivity information for the outer primitives is generated in some other manner, e.g. and in an embodiment, by the tessellation stage). Accordingly, the at least some vertices of the set of vertices that the pre-defined connectivity information is used for are in an embodiment vertices for inner primitives (and in an embodiment all the vertices for the inner primitives).

The pre-defined connectivity information may take any suitable and desired form. In one embodiment, the information is in the form of one or more lists of vertices, in an embodiment one or more lists of indices of vertices. The one or more lists in an embodiment list (indices of) vertices of the set of vertices in the order in which they should be joined up, i.e. to produce the one or more output primitives. As discussed above, these lists are in an embodiment generated by executing an appropriate index list generation routine or algorithm and then stored.

In one embodiment, the one or more lists may list the (indices of) vertices for individual primitives. In this embodiment, for triangular primitives, the list will comprise three entries per primitive. In an embodiment, the one or more lists may take a more compact form. For example, the list may list the (indices of) vertices for one or plural "triangle strips", i.e. one or plural series of connected triangular primitives that share vertices. The use of the predefined connectivity information by the primitive assembly stage will accordingly then comprise the primitive assembly stage looking up the appropriate list of vertices (or vertex indices) to determine the connectivity information for the primitives that it is assembling.

As discussed above, the Applicants have recognised that some of the connectivity information is shared between different tessellation levels, in particular for the inner tessellation levels for triangular tessellation, and that this means that the connectivity information can be provided in a particularly convenient and compact form.

As the inner tessellation level increases (and more inner primitives are produced by the tessellation operation), connectivity information is shared between the different tessellation levels. Each higher tessellation level effectively adds a new set of primitives surrounding the set of primitives of the earlier tessellation level. This then means that the connectivity information for any given inner tessellation level contains within it the connectivity information for all lower inner tessellation levels.

Accordingly, in one embodiment, the pre-defined information comprises one or more lists that list (indices of) vertices for a (suitably high) maximum tessellation level. The one or more lists are in an embodiment used (e.g. by the primitive assembly stage) to define the connectivity information for the maximum tessellation level and all tessellation levels below the maximum tessellation level.

As discussed above and as recognised by the Applicants, for triangular tessellation, connectivity information is shared between the odd inner tessellation levels (i.e. inner tessellation levels of 3, 5, 7, etc.), and connectivity information is shared between the even inner tessellation levels (i.e. inner tessellation levels of 2, 4, 6, etc.). Thus, in an embodiment, the pre-defined information comprises two lists of (indices of) vertices, one list for the even inner tessellation levels and one list for the odd inner tessellation levels.

In embodiments where the pre-defined information comprises one or more lists of vertices (indices) that defines the connectivity information for a maximum tessellation level, for a tessellation operation using a particular tessellation level, the primitive assembly stage should in an embodiment only have to look up the required amount of information from the one or more lists. As will be appreciated, for a lower tessellation level, the primitive assembly stage will need to look up less information than for a higher tessellation level.

In an embodiment, to facilitate this, the one or more lists list the vertices in a selected, in an embodiment predetermined order, and in an embodiment beginning from the innermost primitive(s) and ending with the outermost primitives (or vice versa). As discussed above, since each successive higher tessellation level simply adds new primitives surrounding the existing ones, this means that the primitive assembly stage will need only to read a certain portion of the list in order to obtain the required connectivity information. Accordingly, in an embodiment, the primitive assembly stage is operable to determine how much of (i.e. "how far down") the one or more lists it should read, i.e. depending on the inner tessellation level, and then to only read the determined amount of the one or more lists.

To facilitate this, as well as the vertex list or lists, there is in an embodiment also determined and stored information indicating how much of the lists should be read for a given tessellation level. This information is in an embodiment stored in association with the vertex lists (with the vertex index lists) and is in an embodiment configured such that it can be read (e.g. indexed) using the tessellation level required.

In embodiments where indices are used to index the vertices, corresponding vertices of different tessellation levels (i.e. those vertices that share connectivity information between the tessellation levels) in an embodiment have the same index. This then facilitates the use of a single list (or two lists) for the pre-defined connectivity information for the different tessellation levels. In an embodiment, the vertices are indexed beginning from the vertices of the innermost primitives, and spiralling outwardly to the vertices of the outermost primitives, e.g. in a clockwise or anti-clockwise manner.

The Applicants have correspondingly recognised that it would be desirable for the tessellation stage to output the set of vertices for the one or more output primitives in question (i.e. that the predefined connectivity information relates to) in an order that corresponds to the way that the pre-defined connectivity information is defined (represented). Thus, in an embodiment, the tessellation stage generates (and is configured to generate) the positions of the set of vertices for the one or more output primitives in a particular, in an embodiment selected, in an embodiment predetermined, order. In an embodiment at least some of the vertices in the set of vertices output by the tessellation stage (that are stored in the output vertex array of the tessellation stage) are arranged (and, in an embodiment, the positions of the set of vertices (i.e. the tessellation coordinates for the set of vertices) are generated) in an order that is based on the pre-defined connectivity information that will be used for those vertices, and in an embodiment in an order that corresponds to (that is based on) the order (e.g. the index order) of the pre-defined connectivity information.

Thus, in an embodiment, the positions of the set of vertices (at least for the output primitives that the predefined connectivity information is to be used for (e.g., and in an embodiment, for the inner primitives)) are stored in the vertex array that is the output of the tessellation stage in an order beginning with the vertices of the innermost primitives, and spiralling outwardly to the vertices of the outermost primitives, e.g. in a clockwise or anti-clockwise manner.

As discussed above, in some embodiments, pre-defined connectivity information will be used, e.g., for inner primitives, but for further primitives that the patch is tessellated into, connectivity information, e.g. that is generated by the tessellation stage, will be used. In this case, the set of vertices (the vertex array) output by the tessellation stage is in an embodiment ordered so as to keep separate the vertices that the pre-defined connectivity information is to be used for and the vertices that other connectivity information is to be used for. For example, and in an embodiment, the vertex array output by the tessellation stage in an embodiment lists the vertices that are to use the pre-defined connectivity information first, followed by the vertices that use other connectivity information (or vice-versa). In an embodiment, the vertex order is such that, at least in the case of a triangular tessellation domain, the vertices output by the tessellation stage are ordered starting with the innermost vertices followed by the vertices for the (three) exterior edges of the inner set of vertices, then followed by the vertices for each outer edge of the domain. The "edge" vertices are in an embodiment listed for each edge in turn (i.e. such that vertices for respective edges are not interleaved in the vertex array output by the tessellation stage). Other arrangements would, of course, be possible, if desired.

As discussed above, in some embodiments, at least some of the connectivity information may be calculated (generated) when it is required (but before processing of the patch in question commences), e.g. if the driver recognises that additional pre-defined connectivity information is required.

Thus, in an embodiment, when a tessellation operation is required, i.e. for a particular (e.g. inner) tessellation level, a determination is made (in an embodiment by the driver) as to whether sufficient pre-defined connectivity information is already available. As will be appreciated by those skilled in the art, this will be the case if the particular tessellation level is less than or equal to the maximum tessellation level that pre-defined connectivity information has been generated for, or if pre-defined connectivity information has been previously calculated and stored for a tessellation level greater than or equal to the particular tessellation level in question (e.g. during a previous tessellation operation). If sufficient pre-defined connectivity information is available, then the appropriate information can be, and is in an embodiment, looked up (e.g. by the primitive assembly stage) and used to assemble the output primitives, as discussed above.

If, however, the new tessellation level is greater than the maximum tessellation level, and/or if pre-defined connectivity information has not been previously calculated and stored for a tessellation level greater than or equal to the new tessellation level, then sufficient pre-defined connectivity information will not be available.

As will be appreciated, in this case, the pre-defined connectivity information for the maximum tessellation level and/or whatever pre-defined connectivity information has been previously calculated can be (and in an embodiment is) used for part of the required pre-defined connectivity information for the particular tessellation level (this is possible because, as discussed above, the connectivity information is shared between the different tessellation levels). This then means that only the additional pre-defined connectivity information, i.e. over and above the already available pre-defined connectivity information, will need to be calculated.

Thus, in an embodiment, if it is determined that sufficient pre-defined connectivity information is not available, then (the required) additional pre-defined connectivity information is in an embodiment calculated. The driver for the graphics processing pipeline in an embodiment recognises this situation and triggers the generation of the additional pre-defined connectivity information. The additional pre-defined connectivity information is in an embodiment then used together with the already available pre-defined connectivity information to assemble the one or more output primitives. The additional pre-defined connectivity information is in an embodiment stored for later re-use. As will be appreciated, in this embodiment, the at least some of the vertices are vertices for (inner) primitives for which pre-defined connectivity information is available.

As discussed above, the Applicants have recognised that in triangular tessellation, connectivity information is shared between the inner tessellation levels, and that pre-defined information can be used for the connectivity information, particularly for the inner primitives. However, this may not hold for the outer primitives, and so in an embodiment, the connectivity information for the outer primitives is calculated separately, in an embodiment by the tessellation stage.

Thus, in an embodiment, the primitive assembly stage uses both pre-defined connectivity information and connectivity information generated by the tessellation stage to assemble the output primitives. In an embodiment the pre-defined connectivity information is used to assemble inner output primitives, and the connectivity information generated by the tessellation stage is used to assemble outer output primitives.

It is believed that the idea of separately dealing with the connectivity information for the outer primitives and the connectivity information for the inner primitives may be new and advantageous in its own right.

Thus, a third embodiment of the technology described herein comprises a method of operating a graphics processing pipeline comprising:

tessellating a patch representing some or all of an object to be rendered, so as to generate positions for a set of vertices for a set of output primitives;

calculating and/or looking up information defining the connectivity between vertices of the set of vertices for one or more inner primitives of the set of output primitives;

separately calculating and/or looking up information defining the connectivity between vertices of the set of vertices for one or more outer primitives of the set of output primitives; and assembling output primitives using the positions for the set of vertices, the information defining the connectivity between vertices for the one or more inner output primitives, and the information defining the connectivity between vertices for the one or more outer output primitives.

A fourth embodiment of the technology described herein comprises a graphics processing pipeline comprising:

a tessellation stage operable to tessellate a patch representing some or all of an object to be rendered, so as to generate positions for a set of vertices for a set of output primitives;

wherein the graphics processing pipeline is operable to calculate and/or look up information defining the connectivity between vertices of the set of vertices for one or more inner primitives of the set of output primitives;

wherein the graphics processing pipeline is operable to separately calculate and/or look up information defining the connectivity between vertices of the set of vertices for one or more outer primitives of the set of output primitives; and wherein the graphics processing pipeline further comprises:

a primitive assembly stage operable to assemble output primitives using the positions for the set of vertices, the information defining the connectivity between vertices for the one or more inner output primitives, and the information defining the connectivity between vertices for the one or more outer output primitives.

As will be appreciated by those skilled in the art, these embodiments of the technology described herein can and in embodiments do include any one or more or all of the optional features of the technology described herein, as appropriate. Thus, for example, the information defining the connectivity between the vertices for the one or more inner primitives is in an embodiment pre-defined information that is in an embodiment looked up when required, and the information defining the connectivity between the vertices for the one or more outer primitives is in an embodiment calculated when required. The steps of calculating and/or looking up connectivity information may each comprise a single (separate) draw call.

The graphics processing pipeline may (and in an embodiment does) further comprise a plurality of processing stages downstream of the primitive assembly stage, including at least a rasteriser operable to rasterise the assembled one or more output primitives to generate graphics fragments to be processed, and a renderer operable to process fragments generated by the rasteriser to generate rendered fragment data.

The output primitives assembled by the primitive assembly stage are processed by remaining processing stages of the graphics processing pipeline, such as a rasteriser and a renderer.

The rasteriser of the graphics processing pipeline will, as is known in the art, generate graphics fragments to be rendered, in an embodiment to generate rendered graphics data for sampling points of the desired graphics output, such as a frame to be displayed. Each graphics fragment that is generated by the rasteriser in an embodiment has associated with it a set of sampling points of the graphics output and is to be used to generate rendered graphics data for one or more of sampling points of the set of sampling points associated with the fragment.

The rasteriser may be configured to generate the fragments for rendering in any desired and suitable manner. It will, as is known in the art, receive e.g. primitives to be rasterised, test those primitives against sets of sampling point positions, and generate fragments representing the primitives accordingly.

The renderer should in an embodiment process the fragments generated by the rasteriser to generate rendered fragment data for (covered) sampling points that the fragments represent, as is known in the art. These rendering processes may include, for example, fragment shading, blending, texture-mapping, etc. The renderer is in an embodiment in the form of a programmable fragment shader.

The graphics processing pipeline may also contain any other suitable and desired processing stages that a graphics processing pipeline may contain such as an early depth (or an early depth and stencil) tester, a late depth (or depth and stencil) tester, a blender, etc.

As will be appreciated by those skilled in the art, although the technology described herein has been described above with particular reference to the processing of a single patch representing all or part of an object to be processed, the technology described herein may be, and is in an embodiment, used for plural patches to be processed (whether for the same or different objects), and is in an embodiment used whenever patch tessellation is required. Thus it will, for example, be repeated for each patch for an object being rendered, and for the patches of each object to be rendered, where tessellation is required.

The actual operation in the manner of the technology described herein can be triggered and controlled as desired. For example, and in an embodiment, one or more draw calls can be used to trigger the operation. In one such embodiment, one or more draw calls are used to trigger the processing of the primitives for which pre-defined connectivity information will be used, with another, separate, draw call or calls being used to trigger the processing of those primitives for which pre-defined connectivity information will not be used. Thus, in an embodiment, the inner primitives of a triangular tessellation domain are processed using a first draw call, and then the outer primitives are processed using one or more other draw calls (and in an embodiment one draw call for each outer edge of the triangular domain). Other arrangements would, of course, be possible.

The technology described herein can be used for all forms of output that a graphics processing pipeline may be used to generate, such as frames for display, render to texture outputs, etc.

In an embodiment, the various functions of the technology described herein are carried out on a single graphics processing platform that generates and outputs the rendered fragment data that is, e.g., written to the frame buffer for the display device.

In some embodiments, the graphics processing pipeline comprises, and/or is in communication with, one or more memories and/or memory devices that store the data described herein, and/or store software for performing the processes described herein. The graphics processing pipeline may also be in communication with a host microprocessor, and/or with a display for displaying images based on the data generated by the graphics processor.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Subject to any hardware necessary to carry out the specific functions discussed above, the graphics processing pipeline can otherwise include any one or more or all of the usual functional units, etc., that graphics processing pipelines include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

Embodiments of the technology described herein will now be described in the context of the processing of computer graphics for display.

The present embodiment is particularly concerned with the tessellation operation in a graphics processing pipeline.

As is known in the art, and as discussed above, when a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha) data associated with each fragment so that the fragments can be displayed correctly. Once the fragments have fully traversed the renderer, then their associated data values are stored in memory, ready for output, e.g. for display.

Figure 4:
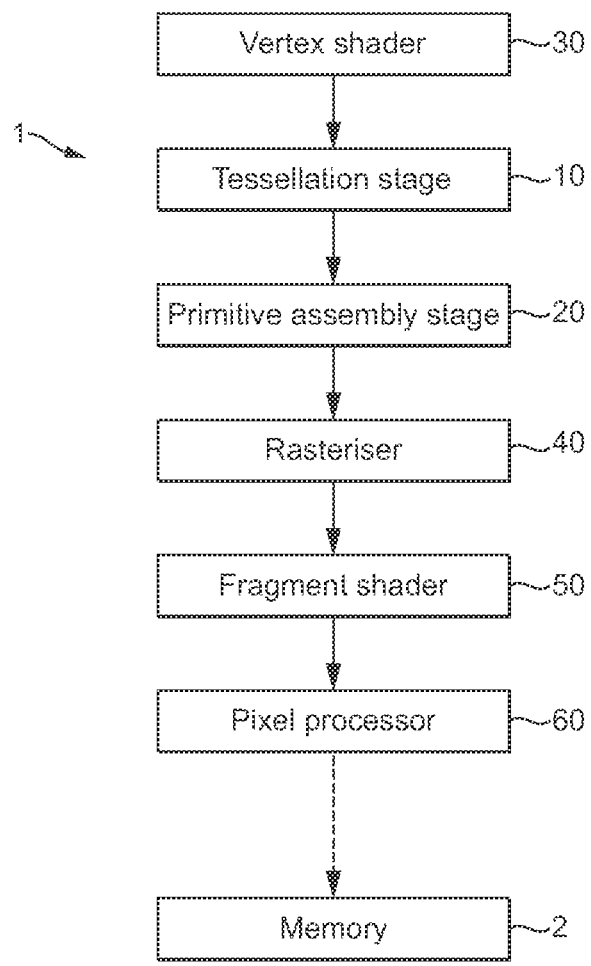
FIG. 4 shows schematically a graphics processing system in accordance with an embodiment of the technology described herein comprising a graphics processing pipeline and a memory.

FIG. 4 shows the main elements of the graphics processing system that are relevant to the operation of the technology described herein. As will be appreciated by those skilled in the art there may be other elements of the graphics processing system that are not illustrated in FIG. 4. It should also be noted here that FIG. 4 is only schematic, and that, for example, in practice the shown functional units and pipeline stages may share significant hardware circuits, even though they are shown schematically as separate stages in FIG. 4.

FIG. 4 shows, schematically, a graphics processing pipeline 1 and a memory 2, which make up part of a graphics processing system for rendering graphics images for display. The pipeline 1 comprises a sequence of different stages, which each perform a different operation on the primitives making up the object to be displayed to prepare them for the final display.

First in the pipeline is a vertex shader 30 which vertex shades the vertices for the output being generated and passes the vertex shaded vertices to a tessellation stage 10.

When the graphics processing pipeline 1 is to produce a desired output, such as a frame to be displayed, the required graphics processing (e.g. frame) will, as is known in the art, be processed as one or more "draw calls". Each draw call will include one or more graphics objects to be processed. For each draw call, a respective set of vertex data which defines vertices to be used for the draw call is defined. In the present embodiments each object to be processed is represented by one or more "patches" which each represent a region of the object in question.

The vertex data for the draw call is processed by the vertex shader 30 to transform the virtual three-dimensional positions of the vertices to their two-dimensional positions in screen space.

Once the vertex processing has been completed, it is then determined whether tessellation has been enabled for the draw call. If tessellation has not been enabled, the processing proceeds directly to the primitive assembly stage 20.

However, for the purposes of the present description, it will be assumed that tessellation has been enabled. In this case, the next stage in the processing is to carry out tessellation in the tessellation stage 10.

The tessellation stage 10 operates to tessellate a patch into a plurality of smaller primitives (this will be discussed further below).

The primitive assembly stage 20 downstream of the tessellation stage 10 then assembles the primitives using the positions of the vertices of the primitives and information defining the connectivity between the vertices (this will also be discussed further below), and passes the assembled primitives to rasteriser 40.

The rasterisation stage 40 operates to rasterise the primitives making up the render output (e.g. the frame to be displayed) into individual graphics fragments for processing. To do this, the rasteriser 40 receives graphics primitives for rendering, rasterises the primitives to sampling points and generates graphics fragments having appropriate positions (representing appropriate sampling positions) for rendering the primitives. The fragments generated by the rasteriser are then sent onwards to the rest of the pipeline for processing.

The graphics fragments generated by the rasteriser 40 are passed to the fragment shader 50 for rendering (shading). The output of the fragment shading stage is, e.g., a set of, e.g., colour values for each sampling position representing the region of the output in question.

The rendered sampling positions from the fragment shading stage are then processed by a pixel processor 60 to, e.g., downsample the rendered sampling positions to provide rendered pixel data for the pixels that will actually be output (e.g. displayed). The pixel data may then, e.g., be output to main memory 2 (e.g. a frame buffer), e.g. for display.

The operation of the tessellation stage 10 and the primitive assembly stage 20 of the present embodiment will now be described in more detail with reference to FIG. 5.

Figure 5:
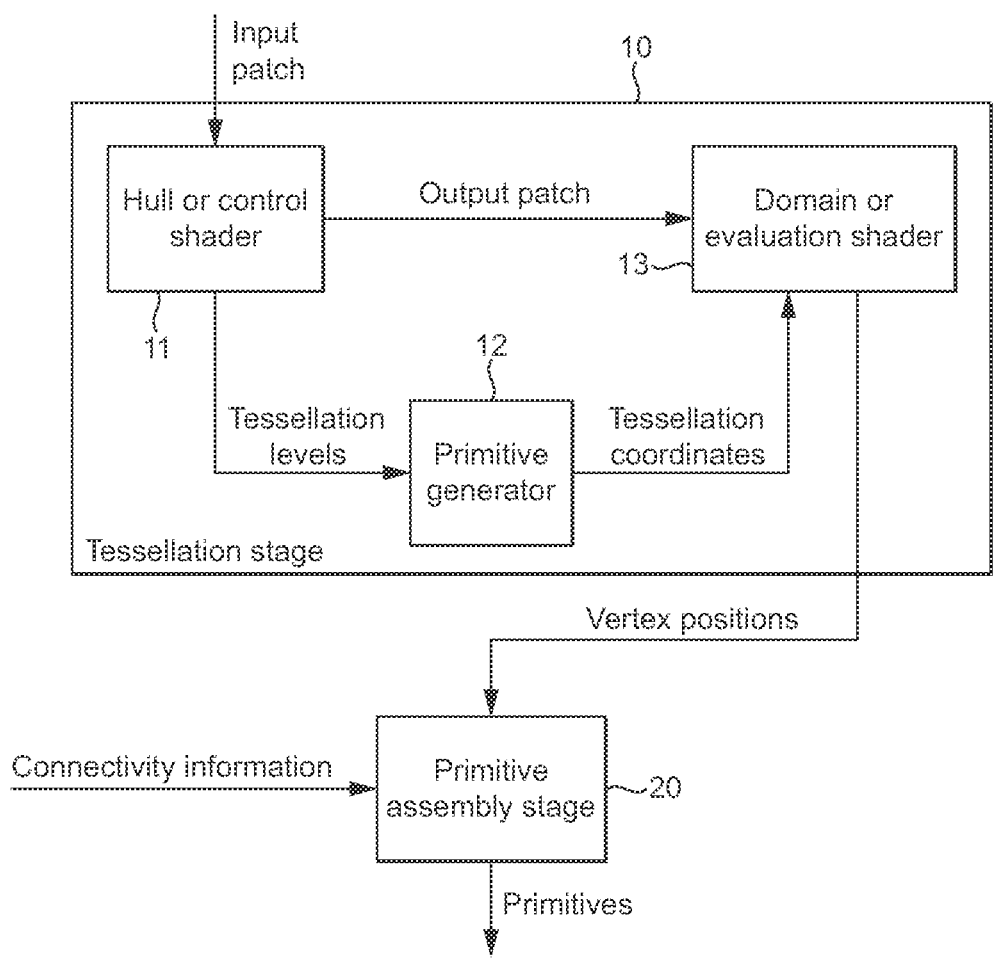
FIG. 5 shows schematically a portion of a graphics processing pipeline in accordance with an embodiment of the technology described herein comprising a tessellation stage and a primitive assembly stage.

FIG. 5 shows the main elements of the tessellation stage 10 and the primitive assembly stage 20 that are relevant to the operation of the technology described herein. As will be appreciated by those skilled in the art there may be other elements of these stages that are not illustrated in FIG. 5. It should also be noted here that FIG. 5 is only schematic, and that, for example, in practice the shown functional units and pipeline stages may share significant hardware circuits, even though they are shown schematically as separate stages in FIG. 5.

The tessellation stage 10 of the present embodiment is operable to carry out triangular tessellation.

A first stage 11 of the tessellation stage 10 receives patch data from the vertex shader 30, and calculates a set of tessellation levels. The manner in which the tessellation levels are calculated may depend, for example, on the position of the camera in the scene to be displayed.

Figure 2:
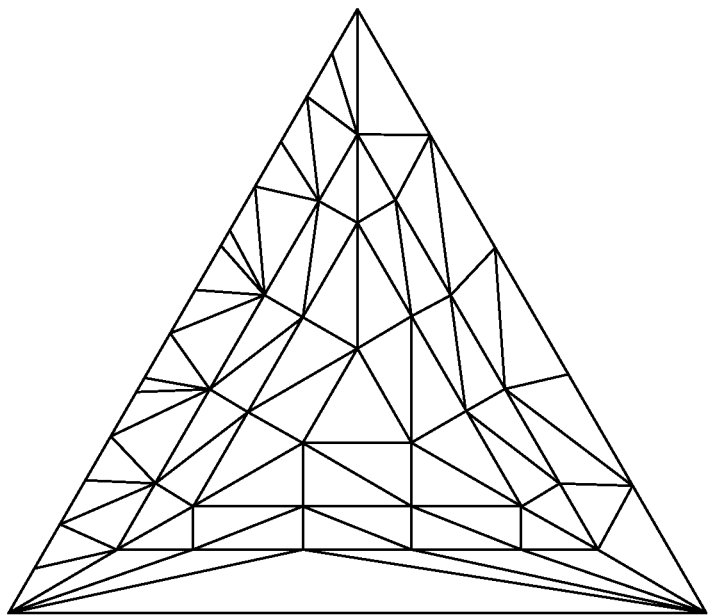
FIG. 2 shows a tessellated triangular domain.

A second stage 12 of the tessellation stage 10 tessellates a triangular tessellation domain into a plurality of triangular tessellation primitives, where the number of tessellation primitives produced depends on the values of the tessellation levels. FIG. 2 illustrates a tessellated triangular domain, where the vertices represent tessellation vertices and the lines between vertices represent the connectivity between the vertices that defines the tessellation primitives.

Figure 3:
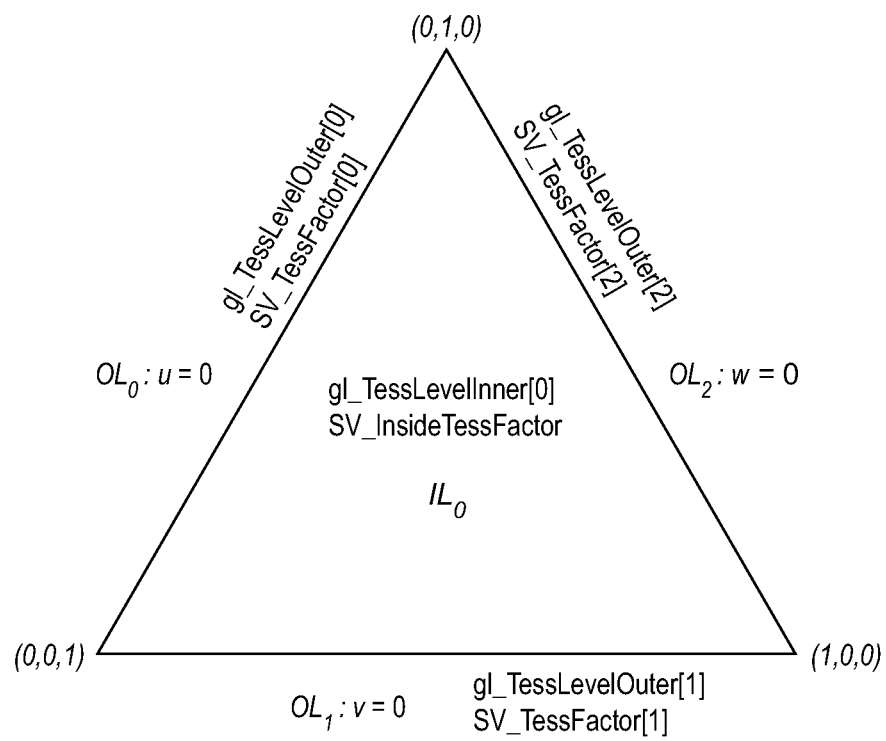
FIG. 3 illustrates the tessellation levels $IL_0$, $OL_0$, $OL_1$, $OL_2$ used in triangular tessellation.

As shown in FIG. 3, the tessellation levels comprise an inner tessellation level, $IL_0$, which controls the number of tessellation primitives to be generated for the inner part of the triangular domain, and three perimeter tessellation levels, $OL_0$, $OL_1$, $OL_2$, i.e. one for each edge of the triangular domain, which (together with the inner tessellation level) control the number of tessellation primitives to be generated for the outer part of the triangular domain.

Figure 6:
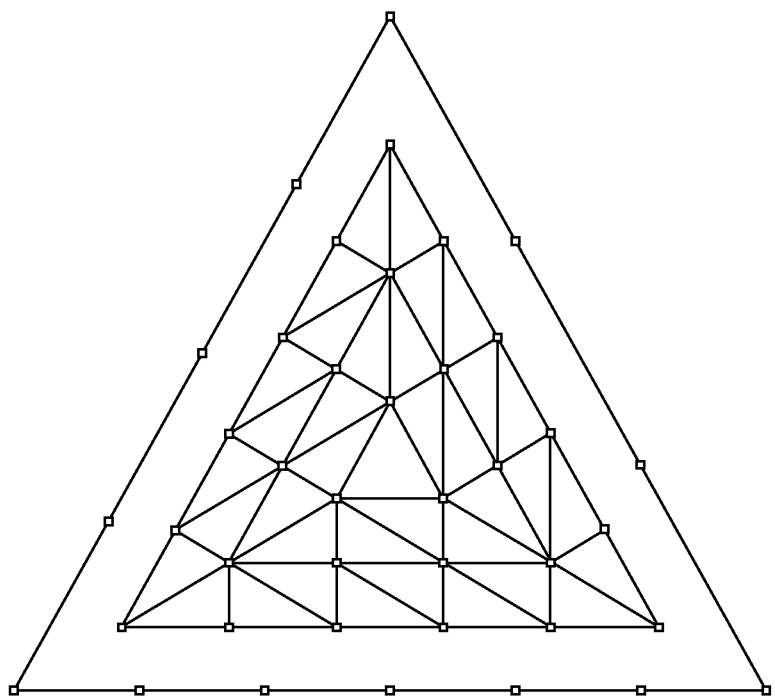
FIG. 6 shows a tessellated triangular domain, where only the connectivity information for the inner primitives is shown.

The outer tessellation primitives are those tessellation primitives that have a vertex on the perimeter of the tessellation domain, and the inner tessellation primitives are those tessellation primitives that do not have any vertices on the perimeter of the domain. This is illustrated by FIG. 6, which depicts a tessellated triangular domain where only the connectivity information for the inner tessellation primitives is shown. (Similarly, the outer output primitives are those output primitives that corresponds to (are derived from) the outer tessellation primitives, and the inner output primitives are those output primitives that correspond to (are derived from) the inner tessellation primitives.)

In the present embodiment, the second stage 12 calculates and outputs the set of tessellation coordinates that define the tessellation primitives that the domain is divided into. The second stage also calculates connectivity information for the outer tessellation primitives but does not, however, calculate the information defining the connectivity between the inner tessellation primitives. As discussed above, this then means that the amount of processing that the tessellation stage must perform during each tessellation operation is significantly reduced when compared with conventional arrangements. (Other arrangements would, of course, be possible.)

(The second stage 12 can calculate the connectivity information for the outer tessellation primitives in any suitable and desired manner, for example using any known and suitable technique for that process.)

A third stage 13 of the tessellation stage 10 maps the generated tessellation coordinates onto the patch, so as to calculate the positions of the vertices of the output primitives, i.e. into which the patch is being tessellated.

The output of the tessellation stage 10 is a set of vertex positions in the form of a stored vertex array. As will be discussed further below, the tessellation stage 10 is configured to generate the vertex positions and store them in the vertex array in a specific order (so as to correspond to the way that the pre-defined connectivity information that the primitive assembly stage 20 uses is configured), namely in the present embodiment starting with the interior vertices and spiralling in a clockwise manner from the centre outwards to the exterior vertices.

Figure 8:
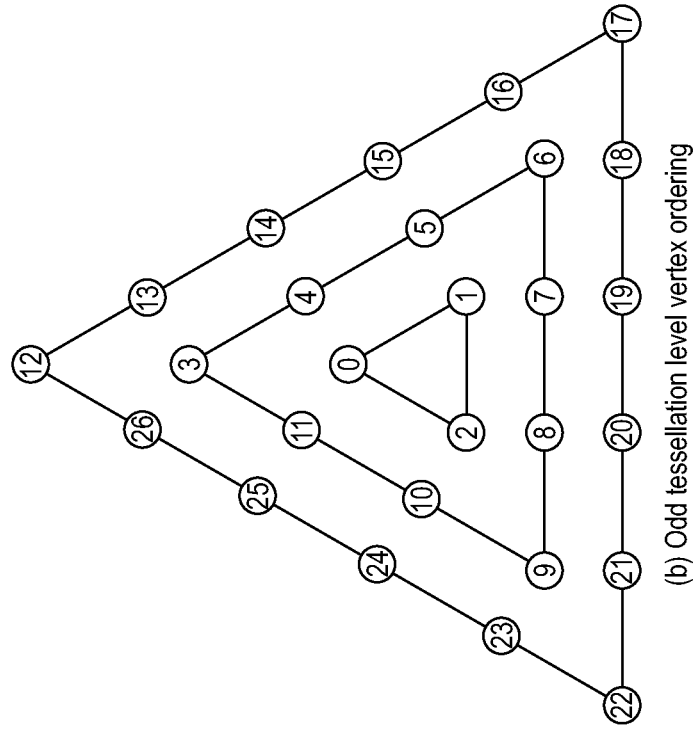
FIG. 8 illustrates the ordering of the vertex indices used in an embodiment of the technology described herein.
Figure 8:
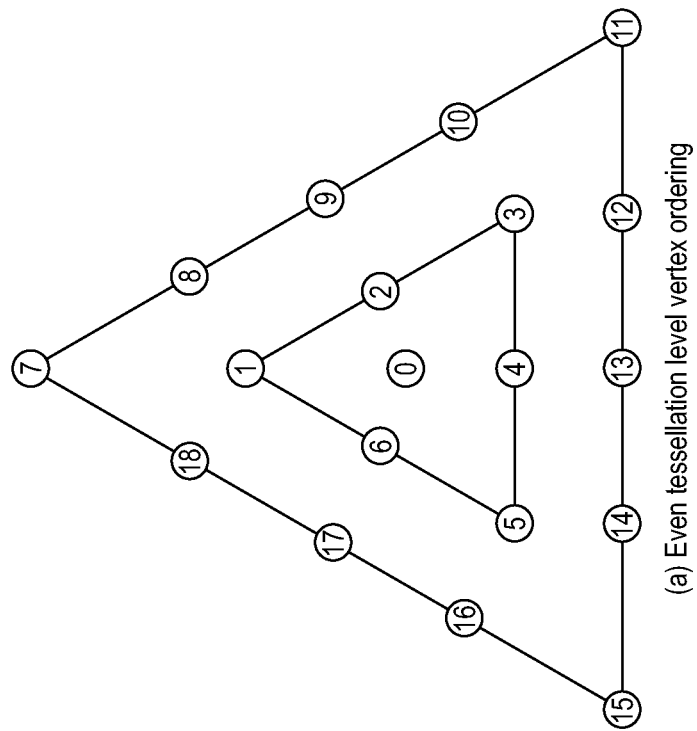

This is illustrated by FIG. 8. For both even inner tessellation levels (FIG. 8(a)) and odd inner tessellation levels (FIG. 8(b)), the vertices are generated and indexed beginning with the most central vertex at the "12 o'clock" position in the domain, and then spiralling outwardly in a clockwise manner.

Figure 9:
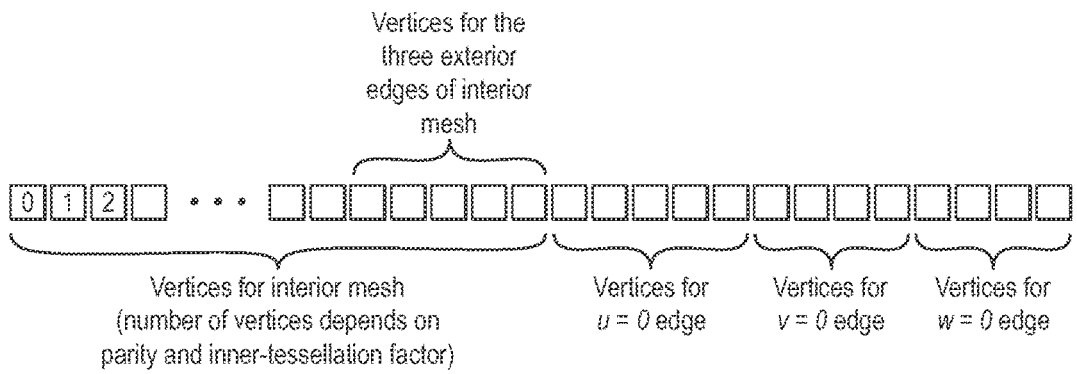
FIG. 9 shows schematically the positioning of vertices in a vertex array, in accordance with an embodiment of the technology described herein.

FIG. 9 illustrates the stored vertex array that is output from the tessellation stage 10 in the present embodiment. The vertices for the patch are stored in a single contiguous memory array, starting with the innermost vertices (starting from the centre and spiralling outwardly), followed by the vertices for the three exterior edges of the inner set of vertices, in the order w, v, u (where u, v and w define the three edges, as shown in FIG. 3), followed by the vertices for the three (outside) edges of the triangular domain in the order u, v, w.

Figure 10:
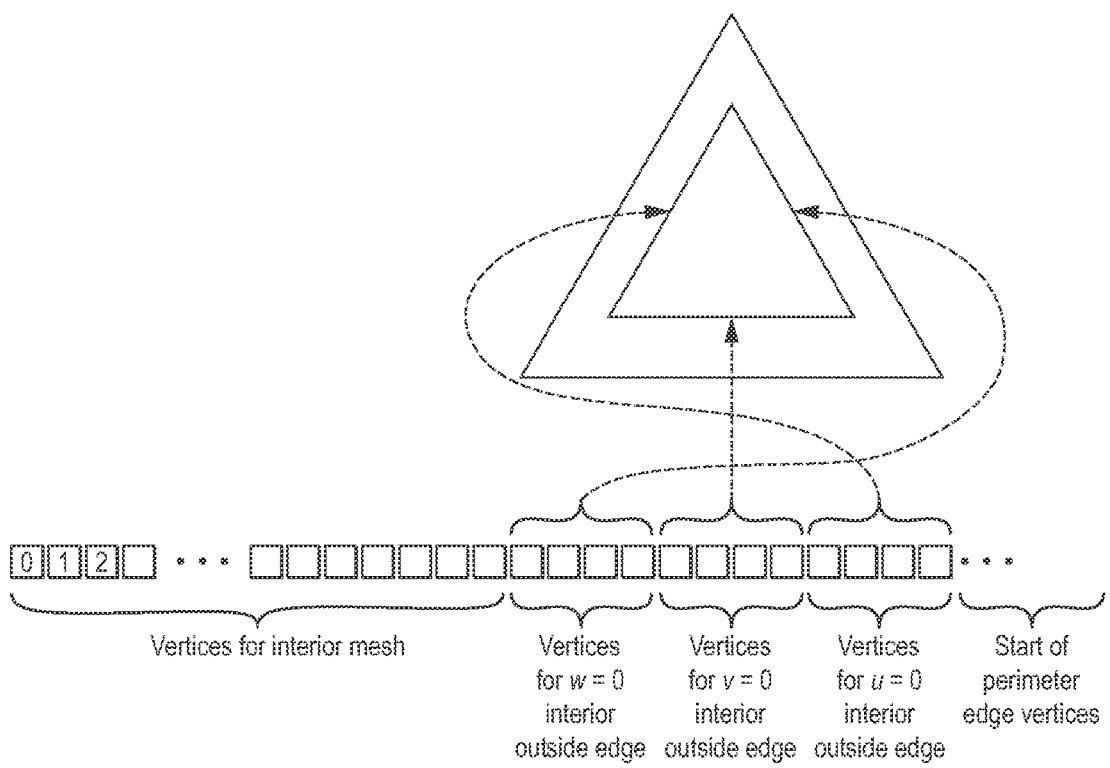
FIG. 10 shows schematically the mapping of the vertices of FIG. 9 to the triangular domain.

FIG. 10 illustrates how the vertices in the stored vertex array of FIG. 9 map to the triangular tessellation domain.

The primitive assembly stage 20 then assembles the output primitives using the positions generated by the tessellation stage, pre-defined connectivity information for the inner primitives, and the connectivity information for the outer primitives from the primitive generator 12. (The information defining the connectivity between the tessellation coordinates is equivalent to and used as the information that defines the connectivity between the vertices of the output primitives.)

The primitive assembly stage 20 looks up the pre-defined connectivity information for the inner primitives from a look-up table when it is required, which may be pre-calculated and stored in memory, or encoded in hardware.

Once assembled, the primitive assembly stage 20 passes the output primitives to the downstream stages of the graphics processing pipeline for further processing (as discussed above).

As discussed above, in triangular tessellation, connectivity information for the inner primitives is shared over the even and odd tessellation levels. This is because each higher (odd or even) tessellation level effectively adds a new set of primitives surrounding the set of primitives produced by the earlier tessellation level.

This is illustrated in FIG. 7, which shows the connectivity information for the inner primitives for three successive odd inner tessellation levels, $IL_0$=3, 5 and 7.

As shown in FIG. 7(a), for an inner tessellation level of 3, the triangular domain is tessellated so as to produce a single triangular primitive in the centre of the domain. As shown in FIG. 7(b), for an inner tessellation level of 5, a corresponding triangular primitive is produced at the centre of the domain, and a set of further primitives are produced which effectively "wrap around", i.e. surround and enclose, the central primitive. The coordinates of the vertices of the central primitive are different in each case, but the connectivity information for the central primitive (i.e. how the coordinates are connected together so as to form the primitive) is the same.

Similarly, and as shown in FIG. 7(c), for an inner tessellation level of 7, a corresponding central triangular primitive and first set of primitives that "wrap around" the central primitive are produced, together with another set of primitives that wrap around the first set of primitives. Again, the coordinates for the central primitive and the first set of primitives are different between the different tessellation levels, but the connectivity information for the central primitive and the first set of primitives is the same between the different tessellation levels.

This property holds for all higher odd inner tessellation levels, and a similar pattern can be found for the even inner tessellation levels. Thus, the connectivity information for any given inner tessellation level contains within it the connectivity information for all lower inner tessellation levels.

This property also holds regardless of the spacing mode used for the tessellation operation. As is known in the art, there are three common spacing modes used in tessellation, which control the spacing provided between the tessellation coordinates, namely: equal spacing, fractional even spacing, and fractional odd spacing. Spacing modes affect the positions of the tessellation coordinates, but not their connectivity.

Accordingly, in the present embodiment, the pre-defined connectivity information comprises two lists of indices that index vertices of the inner primitives, one list for the even inner tessellation levels and one list for the odd inner tessellation levels. The lists list the indices of the vertices in the order in which the vertices should be joined up to produce the output primitives.

Each of the lists lists indices of vertices for a suitably high maximum inner tessellation level, such as for example inner tessellation levels of 63 for the odd list and 64 for the even list. The lists are used for the (inner primitive) connectivity information for the maximum inner tessellation level and all inner tessellation levels below the maximum inner tessellation level.

The lists list the vertices in a predefined order to give their connectivity information, namely beginning with the vertices of the innermost primitives and spiralling outwardly to the vertices of the outermost primitives in a clockwise manner. Other arrangements would, of course, be possible.

(As discussed above, in order to facilitate the use of these lists, the tessellation coordinate generation stage 12 is configured to generate the tessellation coordinates (the vertex positions) in an order that corresponds to the order of the lists. Thus, the tessellation coordinates (the vertex positions) are generated starting with the positions of the vertices of the innermost primitives, and spiralling outwardly to the vertices at the outermost primitives in a clockwise manner.

Correspondingly, corresponding vertices between the different tessellation levels (i.e. those vertices that share connectivity information between the tessellation levels) are labelled with the same index. Thus, in this embodiment, the vertices are indexed beginning from the vertices of the innermost primitives, and spiralling outwardly to the vertices of the outermost primitives in a clockwise manner.)

Each of the lists may list the indices of the vertices for individual primitives, i.e. three entries per primitive. This approach is particularly useful in low-memory situations, where it is desirable to render individual primitives, one per draw call, e.g. to mitigate the tiling and index array memory overhead. Alternatively, the lists may list the indices for a plurality of triangle strips or for a single triangle strip. In the former case, primitive restart tokens may be used to indicate the beginning and/or end of each triangle strip.

Table 1 shows a list of indices for the even inner tessellation levels up to a maximum inner tessellation level of 14, that may be used in accordance with embodiments of the technology described herein. Table 2 shows a list of indices for the odd inner tessellation levels up to a maximum inner tessellation level of 13, that may be used in accordance with embodiments of the technology described herein. It will be appreciated that similar lists can be produced up to any desired maximum tessellation level.

In Tables 1 and 2, the indices follow the convention defined in FIG. 8. Each of the entries for each level defines a triangle strip comprising the additional primitives introduced by that tessellation level. Where indices are repeated, this effectively defines a "zero area triangle", which is used to "turn the corner" in the triangle strip. For inner tessellation levels of 1 and 2, no inner primitives are generated, and only outer primitives are generated.

TABLE 1

// Level 4
1, 0, 2, 3, 3, 0, 4, 5, 5, 0, 6, 1, 1, 1,
// Level 6
7, 1, 8, 2, 9, 3, 10, 11, 11, 3, 12, 4, 13, 5, 14, 15, 15, 5, 16, 6, 17, 1, 18, 7, 7, 7
// Level 8
19, 7, 20, 8, 21, 9, 22, 10, 23, 11, 24, 25, 25, 11, 26, 12, 27, 13, 28, 14, 29, 15, 30, 31, 31, 15, 32, 16, 33, 17, 34, 18, 35, 7, 36, 19, 19, 19,
// Level 10
37, 19, 38, 20, 39, 21, 40, 22, 41, 23, 42, 24, 43, 25, 44, 45, 45, 25, 46, 26, 47, 27, 48, 28, 49, 29, 50, 30, 51, 31, 52, 53, 53, 31, 54, 32, 55, 33, 56, 34, 57, 35, 58, 36, 59, 19, 60, 37, 37, 37,
// Level 12
61, 37, 62, 38, 63, 39, 64, 40, 65, 41, 66, 42, 67, 43, 68, 44, 69, 45, 70, 71, 71, 45, 72, 46, 73, 47, 74, 48, 75, 49, 76, 50, 77, 51, 78, 52, 79, 53, 80, 81, 81, 53, 82, 54, 83, 55, 84, 56, 85, 57, 86, 58, 87, 59, 88, 60, 89, 37, 90, 61, 61, 61, TABLE 1-continued // Level 14
91, 61, 92, 62, 93, 63, 94, 64, 95, 65, 96, 66, 97, 67, 98, 68, 99, 69, 100, 70, 101, 71, 102, 103, 103, 71, 104, 72, 105, 73, 106, 74, 107, 75, 108, 76, 109, 77, 110, 78, 111, 79, 112, 80, 113, 81, 114, 115, 115, 81, 116, 82, 117, 83, 118, 84, 119, 85, 120, 86, 121, 87, 122, 88, 123, 89, 124, 90, 125, 61, 126, 91, 91, 91.

TABLE 2

// Level 3
2, 1, 0, 0,
// Level 5
3, 0, 4, 1, 5, 6, 6, 1, 7, 2, 8, 9, 9, 2, 10, 0, 11, 3, 3, 3,
// Level 7
12, 3, 13, 4, 14, 5, 15, 6, 16, 17, 17, 6, 18, 7, 19, 8, 20, 9, 21, 22, 22, 9, 23, 10, 24, 11, 25, 3, 26, 12, 12, 12,
// Level 9
27, 12, 28, 13, 29, 14, 30, 15, 31, 16, 32, 17, 33, 34, 34, 17, 35, 18, 36, 19, 37, 20, 38, 21, 39, 22, 40, 41, 41, 22, 42, 23, 43, 24, 44, 25, 45, 26, 46, 12, 47, 27, 27, 27,
// Level 11
48, 27, 49, 28, 50, 29, 51, 30, 52, 31, 53, 32, 54, 33, 55, 34, 56, 57, 57, 34, 58, 35, 59, 36, 60, 37, 61, 38, 62, 39, 63, 40, 64, 41, 65, 66, 66, 41, 67, 42, 68, 43, 69, 44, 70, 45, 71, 46, 72, 47, 73, 27, 74, 48, 48, 48, TABLE 2-continued // Level 13
75, 48, 76, 49, 77, 50, 78, 51, 79, 52, 80, 53, 81, 54, 82, 55, 83, 56, 84, 57, 85, 86, 86, 57, 87, 58, 88, 59, 89, 60, 90, 61, 91, 62, 92, 63, 93, 64, 94, 65, 95, 66, 96, 97, 97, 66, 98, 67, 99, 68, 100, 69, 101, 70, 102, 71, 103, 72, 104, 73, 105, 74, 106, 48, 107, 75, 75, 75.

Each of the entries in Tables 1 and 2 defines a triangle strip comprising the additional primitives introduced by that tessellation level. Thus, the connectivity information for any particular inner tessellation level is defined by the entry for that particular level along with the entries for all the earlier levels.

When pre-defined information is required, the primitive assembly stage firstly determines which of the two lists it should read from (i.e. depending on the parity of the inner tessellation level), and then determines how far down the lists it should read, i.e. depending on the magnitude of the inner tessellation level. The primitive assembly stage then only reads the appropriate (determined) amount of the one or more lists, and uses the information to assemble the primitives (as discussed above).

In the present embodiment, the primitive assembly stage may consult a look up table to determine, for a particular inner tessellation level $IL_0$, how far down each of the lists it should read in order to obtain all of the connectivity information for that particular inner tessellation level. Table 3 shows such a look up table, up to a maximum tessellation level of 14, that may be used in embodiments of the technology described herein. It will be appreciated that similar tables can be produced up to any maximum tessellation level as desired.

TABLE 3

| $IL_0$ | | | | | | | | | | | | | | |
|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 |
| 0 | 0 | 0 | 4 | 14 | 24 | 40 | 56 | 78 | 100 | 128 | 156 | 190 | 224 | 264 |

The pre-defined connectivity vertex index lists are generated by means of an appropriate routine or algorithm that generates that information.

In an embodiment, this is done "offline" using an appropriate processor, and the index lists are then stored in a manner such that they can then be provided to and used by the graphics processing pipeline as necessary.

It would also be possible for the overall system that the graphics processing pipeline is part of to generate the pre-defined connectivity information that the primitive assembly stage uses "in use", e.g. as and when it is identified that such information will be required by the graphics processing pipeline.

In this case, the driver for the graphics processing pipeline that is executing on the host processor in an embodiment identifies the need to generate the pre-defined connectivity information and triggers the generation and the storage of that information for use by the graphics processing pipeline, before the patch or patches in question are passed to the graphics processing pipeline for processing.

In this embodiment, when a tessellation operation is required for a particular inner tessellation level, a determination is made as to whether sufficient pre-defined connectivity information is already available in memory. This will be the case if the particular tessellation level is less than or equal to the maximum tessellation level (as discussed above), or if pre-defined connectivity information has been previously calculated and stored for a tessellation level greater than or equal to the particular tessellation level, e.g. during a previous tessellation operation.

If sufficient pre-defined connectivity information is available, then the appropriate information is looked up by the primitive assembly stage and used to assemble the output primitives, as discussed above.

If, however, the particular tessellation level is greater than the maximum tessellation level, and/or if pre-defined connectivity information has not been previously calculated and stored for a tessellation level greater than or equal to the particular tessellation level, sufficient pre-defined connectivity information will not be available.

In this case, the pre-defined connectivity information for the maximum tessellation level and/or whatever pre-defined connectivity information has been previously calculated is used for part of the required pre-defined connectivity information for the particular tessellation level, and the additional pre-defined connectivity information, over and above the available pre-defined connectivity information, is calculated. The additional pre-defined connectivity information is then used together with the available pre-defined connectivity information to assemble the output primitives. The additional pre-defined connectivity information is in an embodiment also stored for later re-use.

The operation in the manner of the technology described herein can be controlled and triggered as desired. For example, a draw call could be defined for processing the inner primitives that a patch will be tessellated into, with a separate draw call or calls then being issued to trigger the processing of the set (or sets) of outer output primitives.

It can be seen from the above that the technology described herein, in its embodiments at least, provides a low power method and system for performing tessellation. This is achieved in embodiments of the technology described herein at least by assembling output primitives using pre-defined information defining the connectivity between at least some of vertices of a set of vertices for the output primitives.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a graphics processing pipeline that comprises a tessellation stage and a primitive assembly stage, the method comprising:
   the tessellation stage tessellating a patch representing some or all of an object to be rendered, so as to generate positions for a set of vertices for one or more output primitives;
   the primitive assembly stage assembling the one or more output primitives for processing using the positions for the set of vertices generated by the tessellation stage and pre-defined information defining how at least some of the vertices of the set of vertices should be connected together to produce one or more of the one or more output primitives, wherein the pre-defined information comprises one or more lists of vertices and defines the connectivity between the vertices of inner primitives of the one or more output primitives, each list listing vertices in an order in which the vertices should be connected together to produce output primitives, wherein the one or more lists of vertices comprises two lists of vertices, comprising a first list for even inner tessellation levels and a second list for odd inner tessellation levels;
   wherein each list lists the vertices for a maximum tessellation level in an order in which the vertices should be joined up to produce the output primitives for the maximum tessellation level, wherein each list defines the connectivity information for the maximum tessellation level and tessellation levels below the maximum tessellation level, and wherein the connectivity information for any given inner tessellation level contains within it the connectivity information for lower inner tessellation levels; and wherein the method further comprises:
     the primitive assembly stage determining which one of the two lists to read depending on the required tessellation level;
     the primitive assembly stage determining how far down one of the two lists to read depending on the required tessellation level by reading stored information indicating how much of a list should be read for a given tessellation level; and
     the primitive assembly stage sequentially reading plural entries from the one of the lists by reading each entry in the list as far down the list as is determined; and
   processing the one or more output primitives to generate an image for display.

2. The method of claim 1, wherein the tessellation stage does not calculate any information defining the connectivity between the set of vertices.

3. The method of claim 1, further comprising the tessellation stage calculating some information defining the connectivity between the set of vertices.

4. The method of claim 3, further comprising the tessellation stage calculating information defining the connectivity between the vertices of the outer primitives of the set of output primitives, but not calculating information defining the connectivity between the vertices of the inner primitives of the one or more output primitives.

5. The method of claim 1, further comprising:
   when a tessellation operation for a particular tessellation level is to be performed at run time, determining at run time whether sufficient pre-defined connectivity information is available; and then
   if it is determined that sufficient pre-defined connectivity information is other than available, generating at run time the unavailable connectivity information in advance of the processing of the patch by the tessellation stage;
   wherein the pre-defined information defines the connectivity between the vertices of the inner primitives of the one or more output primitives.

6. The method of claim 1, wherein the tessellation stage outputs positions of the set of vertices for one or more output primitives in a predetermined order based on the pre-defined connectivity information to be used by the primitive assembly stage.

7. The method of claim 1, wherein each lists list the vertices in an order beginning from the innermost primitive or primitives and ending with the outermost primitives or each list lists the vertices in an order beginning from the outermost primitives and ending with the innermost primitive or primitives.

8. The method of claim 1, further comprising determining and storing information indicating how far down one of the lists should be read for each of plural tessellation levels.

9. The method of claim 1, wherein each list lists vertices in the form of a triangle strip.

10. A method of operating a graphics processing pipeline comprising:
tessellating a patch representing some or all of an object to be rendered, so as to generate positions for a set of vertices for a set of output primitives;
looking up information defining how vertices of the set of vertices should be connected together to produce one or more inner primitives of the set of output primitives, wherein the information comprises one or more lists of vertices and defines the connectivity between the vertices of inner primitives of the one or more output primitives, each list listing vertices in an order in which the vertices should be connected together to produce output primitives;
separately calculating or looking up information defining how vertices of the set of vertices should be connected together to produce one or more outer primitives of the set of output primitives;
assembling output primitives using the positions for the set of vertices, the information defining the connections between vertices for the one or more inner output primitives, and the information defining the connections between vertices for the one or more outer output primitives, wherein the one or more lists of vertices comprises two lists of vertices, comprising a first list for even inner tessellation levels and a second list for odd inner tessellation levels;
wherein each list lists the vertices for a maximum tessellation level in an order in which the vertices should be joined up to produce the output primitives for the maximum tessellation level, wherein each list defines the connectivity information for the maximum tessellation level and tessellation levels below the maximum tessellation level, and wherein the connectivity information for any given inner tessellation level contains within it the connectivity information for lower inner tessellation levels; and wherein the method further comprises:
the primitive assembly stage determining which one of the two lists to read depending on the required tessellation level;
the primitive assembly stage determining how far down one of the two lists to read depending on the required tessellation level by reading stored information indicating how much of a list should be read for a given tessellation level; and
the primitive assembly stage sequentially reading plural entries from the one of the lists by reading each entry in the list as far down the list as is determined; and
processing the set of output primitives to generate an image for display.

11. A graphics processing pipeline comprising:
tessellation stage processing circuitry operable to tessellate a patch representing some or all of an object to be rendered, so as to generate positions for a set of vertices for one or more output primitives;
primitive assembly stage processing circuitry operable to assemble one or more output primitives using the positions for a set of vertices generated by the tessellation stage processing circuitry and pre-defined information defining how at least some of the vertices of the set of vertices should be connected together to produce one or more of the one or more output primitives, wherein the pre-defined information comprises one or more lists of vertices and defines the connectivity between the vertices of inner primitives of the one or more output primitives, each list listing vertices in an order in which the vertices should be connected together to produce output primitives, wherein the one or more lists of vertices comprises two lists of vertices, comprising a first list for even inner tessellation levels and a second list for odd inner tessellation levels;
wherein each list lists the vertices for a maximum tessellation level in an order in which the vertices should be joined up to produce the output primitives for the maximum tessellation level, wherein each list defines the connectivity information for the maximum tessellation level and tessellation levels below the maximum tessellation level, and wherein the connectivity information for any given inner tessellation level contains within it the connectivity information for lower inner tessellation levels; and
wherein the primitive assembly stage configured to determine which one of the two lists to read depending on the required tessellation level;
the primitive assembly stage processing circuitry is operable to determine how far down one of the two lists to read depending on the required tessellation level by reading stored information indicating how much of a list should be read for a given tessellation level;
the primitive assembly stage processing circuitry is operable to sequentially read plural entries from the one of the lists by reading each entry in the list as far down the list as is determined; and
processing circuitry configured to process the one or more output primitives to generate an image for display.

12. The graphics processing pipeline of claim 11, wherein the tessellation stage processing circuitry is configured not to calculate any information defining the connectivity between the set of vertices.

13. The graphics processing pipeline of claim 11, wherein the tessellation stage processing circuitry is operable to calculate some information defining the connectivity between the set of vertices.

14. The graphics processing pipeline of claim 13, wherein the tessellation stage processing circuitry is operable to calculate information defining the connectivity between the vertices of the outer primitives of the one or more output primitives, but to not calculate information defining the connectivity between the vertices of the inner primitives of the one or more output primitives.

15. The graphics processing pipeline of claim 11, wherein the pre-defined information defines the connectivity between the vertices of the inner primitives of the one or more output primitives.

16. The graphics processing pipeline of claim 11, wherein the graphics processing pipeline is part of a data processing system that includes a host processor and the host processor is operable to:
when a tessellation operation for a particular tessellation level is to be performed at run time, determine at run time whether sufficient pre-defined connectivity information is available;
and then if it is determined that sufficient pre-defined connectivity information is other than available, to trigger the generation of the unavailable pre-defined connectivity information in advance of the processing of the patch by the tessellation stage;

wherein the pre-defined information defines the connectivity between the vertices of the inner primitives of the one or more output primitives.

17. The graphics processing pipeline claim 11, wherein the tessellation stage processing circuitry is operable to output positions of the set of vertices for one or more output primitives in a predetermined order based on the pre-defined connectivity information to be used by the primitive assembly stage.

18. A graphics processing pipeline comprising:

tessellation stage processing circuitry operable to tessellate a patch representing some or all of an object to be rendered, so as to generate the positions for a set of vertices for a set of output primitives;

wherein the graphics processing pipeline is operable to look up information defining how vertices of the set of vertices should be connected together to produce one or more inner primitives of the set of output primitives, wherein the information comprises one or more lists of vertices and defines the connectivity between the vertices of inner primitives of the one or more output primitives, each list listing vertices in an order in which the vertices should be connected together to produce output primitives;

wherein the graphics processing pipeline is operable to separately calculate or lookup information defining how vertices of the set of vertices should be connected together to produce one or more outer primitives of the set of output primitives;

wherein the graphics processing pipeline further comprises:

primitive assembly stage processing circuitry operable to assemble output primitives using the positions for the set of vertices, the information defining the connections between vertices for the one or more inner output primitives, and the information defining the connections between vertices for the one or more outer output primitives, wherein the one or more lists of vertices comprises two lists of vertices, comprising a first list for even inner tessellation levels and a second list for odd inner tessellation levels;

wherein each list lists the vertices for a maximum tessellation level in an order in which the vertices should be joined up to produce the output primitives for the maximum tessellation level, wherein each list defines the connectivity information for the maximum tessellation level and tessellation levels below the maximum tessellation level, and wherein the connectivity information for any given inner tessellation level contains within it the connectivity information for lower inner tessellation levels; and wherein the primitive assembly stage configured to determine which one of the two lists to read depending on the required tessellation level;

the primitive assembly stage processing circuitry is operable to determine how far down one of the two lists to read depending on the required tessellation level by reading stored information indicating how much of a list should be read for a given tessellation level;

the primitive assembly stage processing circuitry is operable to sequentially read plural entries from the one of the lists by reading each entry in the list as far down the list as is determined; and processing circuitry configured to process the set of output primitives to generate an image for display.

19. A non-transitory computer readable storage medium storing computer software code which when executing on a processor performs a method of operating a graphics processing pipeline that comprises a tessellation stage and a primitive assembly stage, the method comprising:

the tessellation stage tessellating a patch representing some or all of an object to be rendered, so as to generate positions for a set of vertices for one or more output primitives;

the primitive assembly stage assembling one or more output primitives for processing using the positions for the set of vertices generated by the tessellation stage and pre-defined information defining how at least some of the vertices of the set of vertices should be connected together to produce one or more of the one or more output primitives, wherein the pre-defined information comprises one or more lists of vertices and defines the connectivity between the vertices of inner primitives of the one or more output primitives, each list listing vertices in an order in which the vertices should be connected together to produce output primitives, wherein the one or more lists of vertices comprises two lists of vertices, comprising a first list for even inner tessellation levels and a second list for odd inner tessellation levels;

wherein each list lists the vertices for a maximum tessellation level in an order in which the vertices should be joined up to produce the output primitives for the maximum tessellation level, wherein each list defines the connectivity information for the maximum tessellation level and tessellation levels below the maximum tessellation level, and wherein the connectivity information for any given inner tessellation level contains within it the connectivity information for lower inner tessellation levels; and wherein the method further comprises:

the primitive assembly stage determining which one of the two lists to read depending on the required tessellation level;

the primitive assembly stage determining how far down one of the two lists to read depending on the required tessellation level by reading stored information indicating how much of a list should be read for a given tessellation level; and the primitive assembly stage sequentially reading plural entries from the one of the lists by reading each entry in the list as far down the list as is determined; and processing the one or more output primitives to generate an image for display.

20. A non-transitory computer readable storage medium storing computer software code which when executing on a processor performs a method of operating a graphics processing pipeline comprising:

tessellating a patch representing some or all of an object to be rendered, so as to generate positions for a set of vertices for a set of output primitives;

looking up information defining how vertices of the set of vertices should be connected together to produce one or more inner primitives of the set of output primitives, wherein the information comprises one or more lists of vertices and defines the connectivity between the vertices of inner primitives of the one or more output primitives, each list listing vertices in an order in which the vertices should be connected together to produce output primitives;

separately calculating or looking up information defining how vertices of the set of vertices should be connected together to produce one or more outer primitives of the set of output primitives;

assembling output primitives using the positions for the set of vertices, the information defining the connections between vertices for the one or more inner output primitives, and the information defining the connections between vertices for the one or more outer output primitives, wherein the one or more lists of vertices comprises two lists of vertices, comprising a first list for even inner tessellation levels and a second list for odd inner tessellation levels;

wherein each list lists the vertices for a maximum tessellation level in an order in which the vertices should be joined up to produce the output primitives for the maximum tessellation level, wherein each list defines the connectivity information for the maximum tessellation level and tessellation levels below the maximum tessellation level, and wherein the connectivity information for any given inner tessellation level contains within it the connectivity information for lower inner tessellation levels; and wherein the method further comprises:

the primitive assembly stage determining which one of the two lists to read depending on the required tessellation level;

the primitive assembly stage determining how far down one of the two lists to read depending on the required tessellation level by reading stored information indicating how much of a list should be read for a given tessellation level; and the primitive assembly stage sequentially reading plural entries from the one of the lists by reading each entry in the list as far down the list as is determined; and processing the set of output primitives to generate an image for display.

* * * * *